United States Patent Office 3,118,571
Patented Jan. 21, 1964

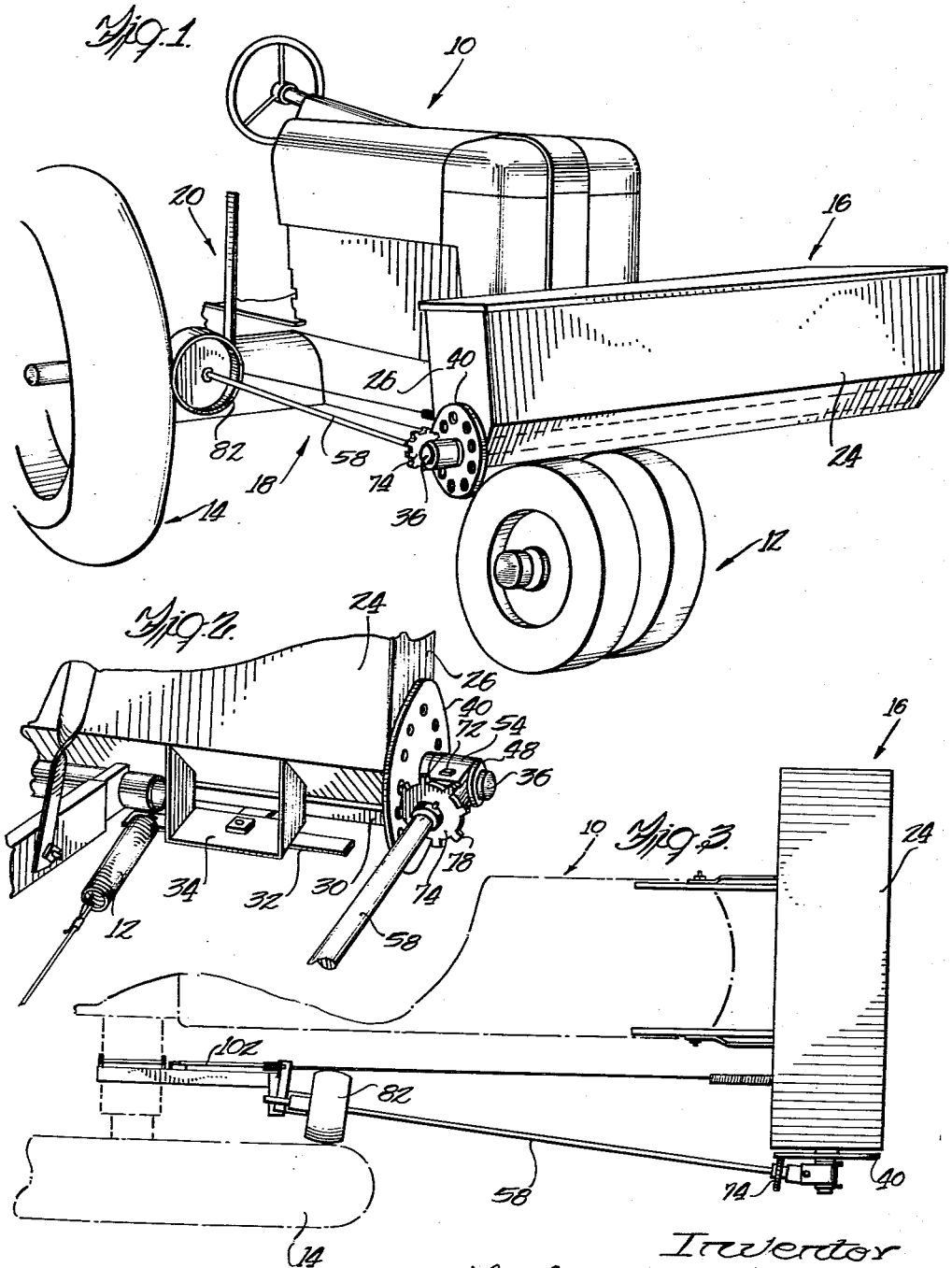

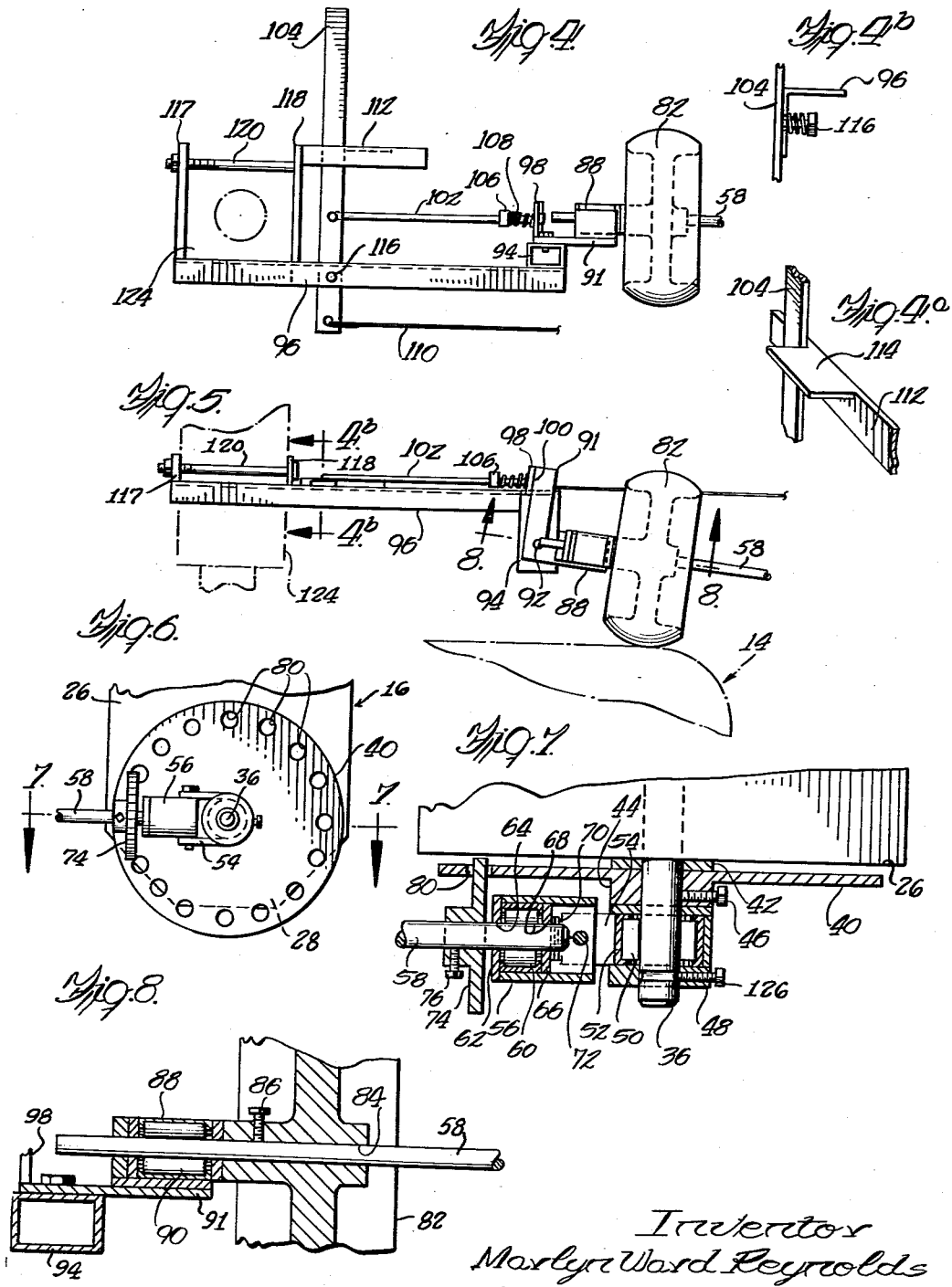

3,118,571
ADJUSTABLE DISPENSER HOPPER DRIVE
MECHANISM
Marlyn Ward Reynolds, Altona, Ill.
Filed Nov. 14, 1960, Ser. No. 68,971
6 Claims. (Cl. 222—177)

This invention relates to an improved driving means for an agricultural dispensing hopper, and more particularly, to such a driving means which utilizes the rotation of one of the wheels of said apparatus to actuate the dispensing hopper agitating mechanism, and which driving means is adaptable for use with a wide variety of types and sizes of agricultural implements.

This application is a continuation in part of my co-pending applications, Serial No. 821,585, filed June 19, 1959, and now abandoned, and Serial No. 16,535, filed March 21, 1960, now Patent No. 3,064,861.

An object of this invention is to provide an improved driving mechanism for an agricultural dispensing hopper which utilizes the rotation of the wheels of an agricultural implement, obviating the necessity of utilizing a power take-off, thus freeing it for other performance.

Another object is to provide such a driving mechanism which is sufficiently flexible or adaptable in application to be utilized with numerous styles, types, sizes and brands of agricultural implements while necessitating only the making of very minor adjustments.

Further objects of this invention are to provide an improved driving mechanism for an agricultural dispensing hopper which is inexpensive to manufacture, which is safe and certain in operation, which includes a very effective arrangement of parts, which includes control means which simultaneously initiates action of the hopper agitator and opens the hopper gate to permit dispensing; and which may be utilized with equipment not including a power take-off means.

Further objects and advantages of the instant invention will become evident from an examination of the more particular description and the drawings, in which:

FIG. 1 is a fragmentary perspective view of a tractor provided with a dispensing hopper and an embodiment of the adjustable drive mechanism of the instant invention;

FIG. 2 is a fragmentary perspective view of the hopper agitator drive;

FIG. 3 is a top plan view of the hopper drive assembly attached to a tractor for use;

FIG. 4 is a fragmentary side elevational view of the press driving wheel and of the engagement mechanism shown in the disengaged position;

FIG. 4a is a fragmentary perspective view of a control lever being retained in the engaging position by the stop flange;

FIG. 4b is a fragmentary sectional view taken substantially on the plane of line 4b—4b in FIG. 5;

FIG. 5 is a fragmentary top plan view of the press driving wheel and engagement means shown in the engaging position;

FIG. 6 is a fragmentary, enlarged side elevational view of the hopper dispenser actuating means;

FIG. 7 is a cross sectional view taken substantially along the plane of line 7—7 in FIG. 6; and FIG. 8 is a cross sectional view taken substantially on the plane of line 8—8 in FIG. 5.

As aforementioned, the instant invention is designed for usage with a wide variety of agricultural implements, and utilizes the basic principle of being driven from one of the rotating wheels on such an implement. To best demonstrate the drive mechanism a preferred embodiment of the invention is shown in the drawings in use with a tractor 10 having two front wheels 12 and two spaced rear or driving wheels 14.

Although the dispensing hopper 16 is shown as being attached to the front end of the tractor 10, it is also to be understood that this hopper could be disposed at the rear of the tractor without departing from the scope or spirit of the instant invention. Indeed, there may be instances of use wherein the disposition of the dispensing hopper 16 at the rear of the agricultural implement or apparatus may be preferable from the standpoint of effective operation.

Very generally, the instant invention is comprised of the dispensing hopper 16, a wheel driven driving assembly shown generally at 18 in FIG. 1, and an engaging mechanism 20.

In general operation, the tractor 10 being in motion, the engaging mechanism 20 is actuated forcing the wheel driven drive assembly 18 into operative relationship with the driving wheel 14 which causes an agitator within the dispensing hopper 16 to be rotated to cause a flow of material outwardly from the hopper and downwardly onto the soil.

The dispensing hopper 16 is preferably that shown in my co-pending application, Serial No. 16,535, filed March 21, 1960, because of the particular advantages recited therein resulting from use of the therein described dispensing hopper.

This hopper may be releasably attached to the front end of the tractor 10, the basic construction of the hopper body and its mode of releasable attachment being shown in my co-pending application, Serial No. 821,585, filed June 19, 1959, to which reference may be had for particular details of construction and modes of operation not herein provided.

Any suitable agricultural dispensing hopper might be used with the instant driving mechanism so long as it includes a rotating agitator for dispensing the material within the hopper. However, to accomplish one of the particular embodiments of the invention, the hopper must be provided with a slidably movable gate, which may be pivoted into and out of engagement or registry with apertures in the lower portion of the hopper to initiate the dispensing action.

The hopper 16 is comprised of side walls 24 extending downwardly and inclined inwardly to provide a conventional hopper shape, said side walls being joined at the ends by end walls 26. The side walls 24 and the end walls 26 are connected together along the bottom edges by a flat bottom wall 28, best seen in FIG. 6, in which is formed a plurality of spaced aligned apertures not shown in the drawings. Associated with the flat bottom wall is an apertured gate 30, indicated in FIG. 2, gate 30 containing corresponding spaced aligned apertures which may be moved into the out of registry with the aforementioned apertures by means of a generally T-shaped cross arm 32, the central portion of the cross arm being pivotally secured to a brace 34. Movement of either end of the cross arm will cause reciprocation of the gate into and out of registry to permit deposition of the material within the hopper.

Immediately above the flat bottom wall 28 is an elongated agitator shaft 36 which extends through the end walls 26 of the hopper body and is journaled for rotation therein. The agitator shaft has affixed thereto agitator means, such as radiating fingers, so that when the shaft is rotated the material within the hopper is agitated and caused to be dispensed from the hopper.

One end of the agitator shaft 36 extends outwardly from the side wall of the hopper and has affixed thereto a drive wheel 40 for rotation therewith. With reference to FIG. 7, the drive wheel 40 may be spaced from the end wall 26 by means of a spacer bearing 42 and may include an attachment shank 44 receiving a bolt 46 to secure the wheel to the shaft to prevent axial movement therealong.

In the arrangement shown the agitator shaft 36 extends outwardly beyond the drive wheel and rotatably receives the first bearing housing 48.

The bearing housing 48 is generally cylindrical having a central bore for receiving the shaft 36, and may be appropriately provided with an annular recessed groove to receive the roller bearings indicated at 50. Further, the first bearing housing 48 is provided with a central reduced diametric portion 52 which permits the recipient of the U-strap 54 used to pivotally secure the second bearing housing.

The second bearing housing 56 again is of a generally cylindrical construction including a bore for rotatably receiving the one end of the drive shaft rod 58. The interior portion of the second bearing housing 56 may be appropriately recessed to receive roller bearings 60 to rotatably support the drive shaft 58. Instead of being recessed, the bearing housing 56 may be provided with a front wall 62 having an aperture 64 and an intermediate wall 66 having a second aperture 68 aligned with the first aperture 64. This then provides an accommodating recess for the roller bearings and further permits the end of the drive shaft rod 58 to extend through the intermediate wall where an appropriate thrust bearing means such as a washer held in place by a cotter pin 70 may be easily provided to prevent axial movement of the drive shaft outwardly from the second bearing housing. Further, to pivotally secure the first and second bearing housings, the two projecting ends of the U-strap 54 are received over the rear end of the second housing and an appropriate pivot pin 72 is inserted through the ends of the U-strap 54 and through the rear end of the second bearing housing 56.

A gear wheel 74 is mounted on the drive shaft rod 58 adjacent the second bearing housing and is held in place axially by means of a bolt or set screw 76. The gear wheel 74 is provided with extraordinarily elongated teeth 78, best seen in FIG. 2, which progressively engage the spaced openings 80 adjacent the circumference of the drive wheel 40. It is to be noted that each of the apertures 80 must be of sufficient diameter to permit the elongated teeth 78 to freely enter and exit therefrom during the driving cycle in various positions pivotally assumed by the drive shaft in relation to the wheel.

Turning to FIGS. 4, 5 and 8, the other end of the drive shaft rod 58 receives a press wheel 82 which is mounted for rotation on said shaft through an appropriate bore 84, the wheel being secured to said shaft by an adjustment bolt 86 which also permits the wheel to be mounted axially along the rod at any desired point to make contact with the rotating wheel 14 of the agricultural implement. The other end of the rod is received within a third bearing housing 88 which may be appropriately provided with a recess to receive the roller bearings 90.

The third bearing housing 88 is mounted on one arm of a generally L-shaped lever arm 91 pivotally secured by means of a pivot pin 92 to the upper surface of bracket 94 which is secured at right angles to brace 96 secured to the tractor frame 98. The other end of the lever arm is provided with a vertically extending flange 98 including an aperture 100 therethrough which receives one end of the control rod 102.

The control rod 102 is substantially parallel to the brace 96, the other end of the control rod 102 being pivotally mounted on the upper portion of the control lever 104, the pivotal mounting as shown being provided by an end bend on rod 102 inserted through an aperture on the control lever 104. The opposite end of the control rod 102 is provided with an annular spring seat 106 which constrains the compression spring 108 against the flange 98.

The control lever 104 is pivotally secured to the brace 96 and extends downwardly therebelow as indicated in FIG. 4. The lower end of the control lever 104 is provided with an aperture within which one end of the control wire 110 is secured, the other end of the control wire being secured to a spring member 111 which is secured to one end of the cross arm 32, as is shown in FIG. 2.

Returning to FIGS. 4, 4a and 4b, in order to retain the control lever 104 in the position desired, a retention arm 112 is provided having one end secured with respect to the frame of the agricultural implement, the other end extending outwardly generally parallel to but above brace 96 and above the point at which the control rod 102 has been pivotally attached to the control lever 104. This retention arm 112 is provided with a stop flange 114 which extends into the plane of the normal pivotal movement of the control lever 104.

To effectively utilize retention arm 112 with its stop flange 114, the control lever 104 is pivotally secured with respect to brace 96 by means of a loose fitting pivot 116 which includes a compression spring means between the outer end of the pivot pin and the brace 96 to permit the control lever to be moved outwardly in relation to brace 96 and yet to be urged back into a vertical position wherein the stop flange prevents movement of the lever to the other operating position through the normal vertical pivotal plane.

Further, in the embodiment shown it will be noted that the brace member 96 is provided with two upwardly extending spaced straps 117 and 118 which permits the control assembly to be strapped around a conventional tractor housing and secured thereto by means of the bolt member 120 extending through each of said straps. In this arrangement, the retention arm 112 is secured to the upper end of strap 118 and projects forwardly therefrom.

Although the attachment of the instant drive mechanism to any type of agricultural implement is contemplated, it will herein be described as being secured with relationship to the tractor shown in the drawings. First, the engaging mechanism assembly 20 is secured to the axle housing, as shown at 124 in FIG. 4 by moving the brace 96 upwardly with strap members 117 and 118 on either side of the housing. The bolt 120 is then secured and tightened securing the engaging mechanism with respect to the axle housing or frame.

The driving mechanism is then secured by attaching the first bearing housing 48 to the axle 36, the adjustment screw 126 being turned to extend into the annular groove at the end of the shaft to prevent axial movement outwardly. Because of the pivotal connection of the one end of the drive shaft 58 with respect to the first bearing housing, the engaging mechanism 20 may be spaced at any point through a wide range on the axle housing or other frame to accommodate various brands and styles of agricultural implements while retaining the driving relationship between the shaft and the agitator. Further, the press wheel 82 may be adjusted along the axis of the drive shaft rod 58 until it is in position where it will contact the edge of the wheel 14 when moved to the engaging position. This adjustability of the press wheel 82 further accommodates the use of various types of wheels and sizes as would be encountered from the use of wide variety of brands, styles and types of agricultural implements.

When the drive mechanism is secured, the agricultural implement, in this case a tractor, is then caused to move forwardly and when it is desired to dispense the material within the hopper 16, the control lever 104 is moved forwardly beyond the forward edge of the stop flange 114 where it is retained by the spring actuated pivot 116. This movement of the control lever 104 is transferred through control rod 102 which moves forwardly causing the compression spring 108 to bear against the flange 100 and pivot the L-shaped control lever 91 clockwise, as viewed in FIGURE 5, causing the third bearing housing 88 and the press wheel 82 to be moved into contact with the turning wheel 14. The action of the spring 108 on the flange 98 assures that the press wheel will be kept in engaging contact with the turning wheel 14 even though there may be minor variations on the surface circumference of each while rotating.

The rotation of the press wheel 82 causes the rotation of the drive shaft rod 58, the turning of the gear wheel 74 and, the resultant progressive engagement of the teeth 78 within the openings 80, rotation of both the drive wheel 40 and the agitator shaft 36 to cause the dispensation of material from the hopper.

Simultaneously, as lever 104 is moved forwardly to cause the engagement of the press wheel, the control wire 110 pulls upon the spring element 111 causing the lever arm 32 to be moved counter-clockwise to move the gate with respect to the bottom wall causing the apertures within each to come into registry to permit dispensation.

It is to be noted from the foregoing description that the elongated teeth 78 permit the shaft 58 to be pivoted through a fairly wide angle without disrupting the drive between the gear wheel 74 and the drive wheel 40.

From the foregoing description of the details of the adjustable dispenser hopper drive mechanism of the instant invention and from its method of operation it is seen that a mechanism has been provided for driving an agricultural dispensing hopper which utilizes the rotation of the wheels of the implement, which obviates the necessity of utilizing a power take-off, thus freeing the power take-off for other usages, which driving mechanism is sufficiently flexible or adaptable in application to be utilized with numerous styles, types, sizes and brands of agricultural implements while necessitating the making of only very minor adjustments; which is inexpensive to manufacture, safe and certain in operation, utilizing only a minimum number of parts and which includes control means for simultaneously initiating the action of the hopper agitator and the opening of the hopper gate, and which may be utilized with equipment not including power take-off means.

I claim:

1. A dispenser hopper drive mechanism for an agricultural implement having two wheels and a dispenser hopper body laterally mounted thereon, said hopper being actuated by a drive wheel mounted on an agitator shaft extending into said hopper body, said mechanism comprising a first bearing housing including a first journal for receiving one end of said shaft, a second bearing housing pivotally secured to said first housing and including a second journal, an elongated drive shaft rod having one end received and retained for rotation in said second journal, power transfer means on said drive wheel and on said drive shaft for providing a driving relation therebetween in various positions pivotally assumed by said shaft in relation to said drive wheel, a press wheel mounted for rotation on the opposite end of said drive shaft, means for selectively securing said press wheel at any desired point along the axis of said drive shaft, a brace secured to the frame of said implement, a lever having two arms extending outwardly from a central portion pivotally secured to said brace, a third bearing housing secured to one of said lever arms and including a journal means for receiving the other end of said drive shaft, a control lever pivotally secured to said brace, and spring means extending between said control lever and the other of said lever arms for selectively urging said press wheel into resilient contact with one of said implement wheels.

2. A dispenser hopper drive mechanism for an agricultural implement having two wheels and a dispenser hopper body laterally mounted thereon, said hopper being actuated by a drive wheel mounted on an agitator shaft extending into said hopper body, said mechanism comprising a first bearing housing including a first journal for receiving one end of said agitator shaft, a second bearing housing pivotally secured to said first housing and including a second journal, an elongated drive shaft rod having one end received and retained within said second journal for rotation therein, power transfer means on said drive wheel and on said drive shaft for providing a driving relation therebetween in various positions pivotally assumed by said shaft in relation to said wheel, a press wheel mounted for rotation on the opposite end of said drive shaft, means for selectively securing said press wheel at any desired point along the axis of said drive shaft, a brace fixedly secured to the frame of said implement, a third bearing housing pivotally secured with respect to said brace and including a journal means receiving the other end of said drive shaft, a lever arm for pivoting said third bearing housing, a control lever pivotally mounted on said brace, a control rod having one end pivotally secured to said control lever, spring means on the other end of said control rod in contact with said lever arm to urge said press wheel into resilient contact with one of said implement wheels.

3. A dispenser hopper drive mechanism for an agricultural implement having two wheels and a dispenser hopper body laterally mounted thereon and including a gate for controlling the flow of material therefrom, said hopper being actuated by a drive wheel mounted on an agitator shaft extending into said hopper body, said mechanism comprising a first bearing housing including a first journal for receiving one end of said agitator shaft, a second bearing housing pivotally secured to said first housing and including a second journal, an elongated drive shaft rod having one end received and retained within said second journal for rotation, power transfer means on said drive wheel and on said drive shaft for providing a driving relation therebetween in various positions pivotally assumed by said shaft in relation to said wheel, a press wheel mounted for rotation on the opposite end of said drive shaft and including means for selectively securing said press wheel at any desired point along the axis of said drive shaft, a brace fixedly secured to the frame of said implement, a third bearing housing pivotally secured to said brace and including a journal means receiving the other end of said drive shaft, a lever arm for pivoting said third bearing housing, a control lever pivotally mounted on said brace and extending downwardly therebelow, a control rod having one end pivotally secured to said control lever, spring means on the other end of said control rod in contact with said lever arm to urge said press wheel resiliently into contact with one of said implement wheels, and means secured to the lower end of said control lever for controlling the opening of the hopper gate.

4. A dispenser hopper drive mechanism for an agricultural implement having two wheels and a dispenser hopper body laterally mounted thereon, said hopper being actuated by a drive wheel mounted on an agitator shaft extending into said hopper body, said mechanism comprising a first bearing housing including a first journal for receiving one end of said agitator shaft, a second bearing housing pivotally secured to said first housing and including a second journal, an elongated drive shaft rod having one end received and retained within said second journal for rotation, power transfer means on said drive wheel and on said drive shaft for providing a driving relation therebetween in various positions pivotally assumed by said shaft in relation to said wheel, a press wheel mounted for rotation on the opposite end of said drive shaft, means for selectively securing said press wheel at any desired point along the axis of said drive shaft, a brace fixedly secured to the frame of said implement, a third bearing housing pivotally secured to said brace and including a journal means receiving the other end of said drive shaft, a lever arm for pivoting said third bearing housing, a control lever pivotally mounted on said brace, a control rod having one end pivotally secured to said control lever, spring means on the other end of said control rod in contact with said lever arm to urge said press wheel into resilient contact with one of said implement wheels, said control lever being loosely pivotally mounted to permit pivotal movement in other than the vertical plane, said brace having spring means urging said lever into the vertical plane, and stop means within the vertical plane of movement of said control lever to retain the lever in the engaging and non-engaging positions.

5. A dispenser hopper drive mechanism for an agricultural implement having two wheels and a dispenser hopper body laterally mounted thereon, said hopper being actuated by a drive wheel mounted on an agitator shaft extending into said hopper body, said mechanism comprising a first bearing housing including a first journal for receiving one end of said agitator shaft, a second bearing housing pivotally secured to said first housing and including a second journal, an elongated drive shaft rod having one end received and retained within said second journal for rotation, power transfer means on said drive wheel and on said drive shaft for providing a driving relation therebetween in various positions pivotally assumed by said shaft in relation to said wheel, a press wheel mounted for rotation on the opposite end of said drive shaft, means for selectively securing said press wheel at any desired point along the axis of said drive shaft, a brace fixedly secured to the frame of said implement, a third bearing housing pivotally secured to said brace and including a journal means receiving the other end of said drive shaft, a lever arm for pivoting said third bearing housing, a control lever pivotally mounted on said brace, a control rod having one end pivotally secured to said control lever, spring means on the other end of said control rod in contact with said lever arm to urge said press wheel into resilient contact with one of said implement wheels, and means for retaining said control lever in the engaging and non-engaging positions.

6. A dispenser hopper drive mechanism for an agricultural implement having two wheels and a dispenser hopper body laterally mounted thereon, said hopper being actuated by a drive wheel mounted on an agitator shaft extending into said hopper body, said mechanism comprising a first bearing housing including a first journal for receiving one end of said shaft, a second bearing housing pivotally secured to said first housing and including a second journal, an elongated drive shaft rod having one end received and retained for rotation in said second journal, power transfer means on said drive wheel and on said drive shaft for providing a driving relation therebetween in various positions pivotally assumed by said shaft in relation to said drive wheel, a press wheel mounted for rotation on the opposite end of said drive shaft, a brace secured to the frame of said implement, a lever having two arms extending outwardly from a central portion pivotally secured to said brace, a third bearing housing secured to one of said lever arms and including a journal means for receiving the other end of said drive shaft, a control lever pivotally secured to said brace, and spring means extending between said control lever and the other of said lever arms for selectively urging said press wheel into resilient contact with one of said implement wheels.

References Cited in the file of this patent
UNITED STATES PATENTS

| | | |
|---|---|---|
| 256,395 | Smith | Apr. 11, 1882 |
| 671,655 | Overrocker | Apr. 9, 1901 |
| 908,207 | Crane | Dec. 29, 1908 |
| 2,760,685 | Underwood | Aug. 28, 1956 |